July 10, 1956 T. TOGNOLA 2,753,616
METHOD FOR MAKING ELECTRICAL CONDENSER
Filed March 19, 1948 2 Sheets-Sheet 1
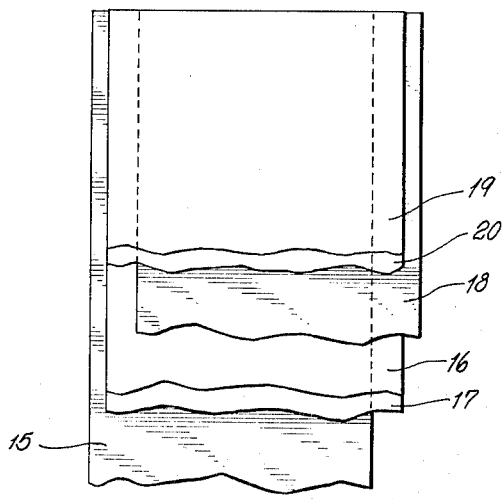
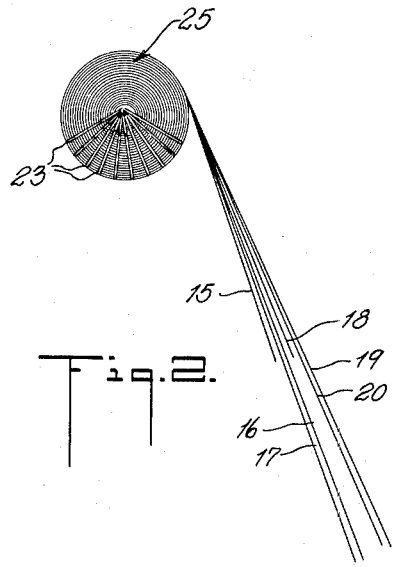
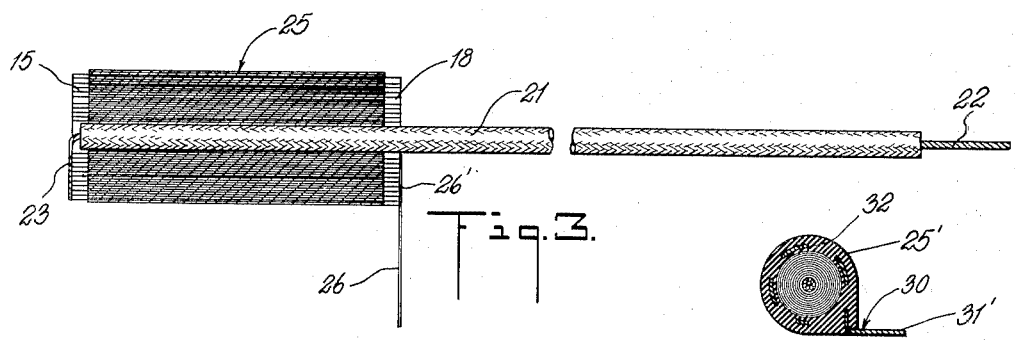
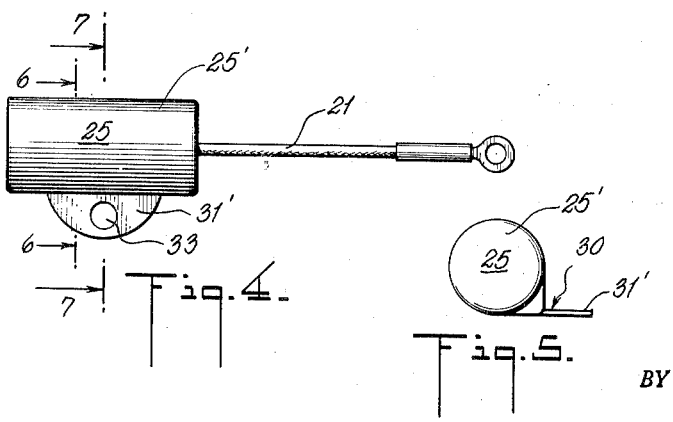
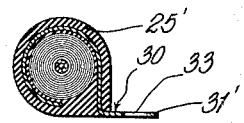
INVENTOR.
Tullio Tognola
BY
Dale A. Bauer
ATTORNEY July 10, 1956     T. TOGNOLA     2,753,616
METHOD FOR MAKING ELECTRICAL CONDENSER
Filed March 19, 1948     2 Sheets-Sheet 2
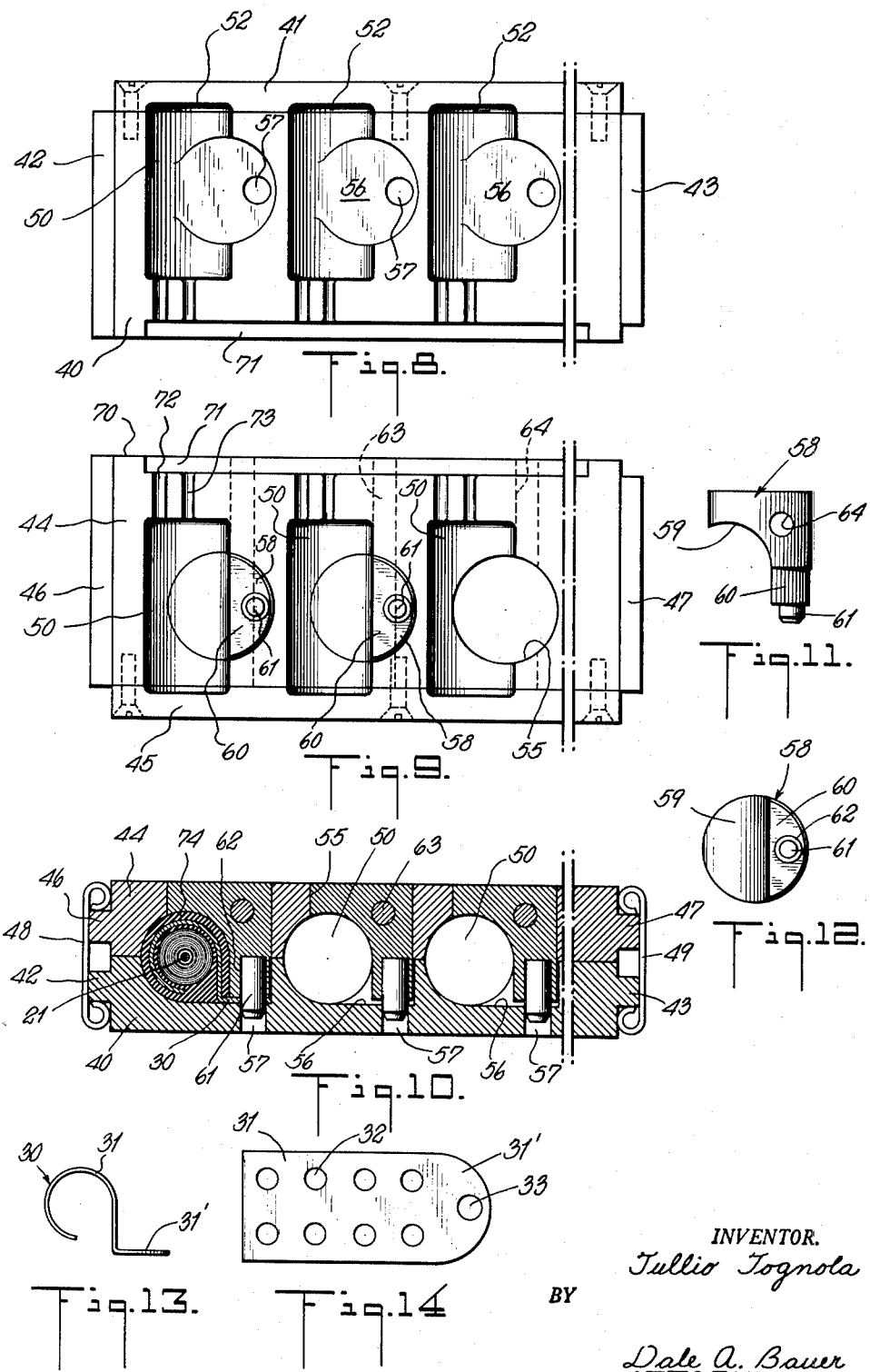
INVENTOR.
Tullio Tognola
BY
Dale A. Bauer
ATTORNEY United States Patent Office 2,753,616
Patented July 10, 1956

2,753,616

METHOD FOR MAKING ELECTRICAL CONDENSER

Tullio Tognola, Sidney, N. Y., assignor to Bendix Aviation Corporation, New York, N. Y., a corporation of Delaware Application March 19, 1948, Serial No. 15,773

3 Claims. (Cl. 29—25.42)

This invention relates to condensers, and particularly to condensers of the type employed in ignition systems.

The outboard motors employed in pushing small boats over the waterways of the nation brought to light certain defects inherent in condenser structure. The vibration of such motors, which are frequently of only one or two cylinders, is so violent, and their conditions of use are so severe, that it was found that some condensers developed defects not observable on engines of more cylinders and greater weight. In particular, the connections between condenser and conductors tended to give away and various difficulties arose internally. High relative humidity impairs their electrical performance. It is consequently an object of the invention to construct condensers in a more integral fashion with stronger support for the connections and better sealing against the entry of gases and liquids.

It is another object of the invention to simplify and improve the condenser structure, and to develop a new and superior method of making condensers.

Yet another object is concerned with methods of sealing, encasing, and impregnating condensers so that they will be weather and shockproof under the most adverse conditions.

The objects of the invention are accomplished, generally speaking, by constructing an impregnated, encased condenser of alternate windings of metal and insulation over a conductor core, leaving alternate metal windings exposed on opposite sides of the insulation for connection to the core and to another conductor respectively. In this way, the conductor adjacent its connection to the core is carried by and moves with the condenser itself so that no relative motion is possible. Also, the casing and impregnant are preferably one, so that in effect not only the condenser itself but every turn, connection, and element of the condenser is encased in an envelope of non-conducting plastic. The same material that protects the surface against shock and moisture also protects the layers of the condenser against transmitted shocks and consequential damage.

The preferred method of making the condenser is to wind it on a mandrel, remove the mandrel, and insert a conductor through the hole, but it is also possible to wind the condenser directly on the conductor. In winding, a sandwich is made up, in the preferred form of the invention, composed of a strip of metal foil, two strips of dielectric paper, a strip of metal foil and two more strips of dielectric paper. The first strip of foil extends beyond the paper to the left, and the second metal strip extends beyond the paper to the right. The foil is shorter than the paper at the end so that there may be some outer turns of paper to serve as a shell for the condenser body.

A circumferential metal clip is sprung over the wound condenser body to hold the coils in place and to serve as a mount and ground. The projecting turns of the metal coil are soldered to a metal piece which is in turn soldered or welded to the clip. The metal piece is preferably connected to all the turns in one end of the condenser on one side of a diameter.

The other projecting turns are connected in a novel way to the conductor, which is preferably a wire of several strands, which are fanned out at the end and soldered to all the coils on one side of a diameter. The insulated body of the wire passes through the central hole in the windings and is of such size as to form a snug fit.

The condenser thus constructed is placed in a mold, evacuated, and impregnated with a dielectric plastic which makes its way between all the coils, impregnates the insulating paper, and covers the condenser with an impermeable case that also contributes to the support of the conductors and connections.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings wherein like reference characters refer to like parts throughout the several views, Fig. 1 is a plan view of a sandwich composed of alternate conducting and non-conducting strips used to construct the condenser.

Fig. 2 is an end view of the condenser almost completed.

Fig. 3 is a section through the axis of the condenser.

Fig. 4 is a plan view of a completed condenser.

Fig. 5 is an end view of the same condenser.

Fig. 6 is a section on line 6—6 of Fig. 4.

Fig. 7 is a section on line 7—7 of Fig. 4.

Fig. 8 is a plan view of the lower half of an impregnating mold.

Fig. 9 is a plan view of the underside of the upper section of the mold.

Fig. 10 is a vertical section through the assembled parts of the mold.

Fig. 11 is a vertical elevation of a part of the mold.

Fig. 12 is an inverted plan view of the piece shown in Fig. 11.

Fig. 13 is an end view of the mounting clip, and

Fig. 14 is a plan view of the metal strip from which the clip of Fig. 13 is made.

The novel process of making the condensers that conform to this invention is of such nature that the construction of the condenser will be better understood after considering it. Consequently, it will be described first and with particular relation to Figs. 1, 2 and 8 to 12. As hereinabove stated, the condenser is made by winding a sandwich composed of alternate strips of conductive and non-conductive material upon a mandrel or a conducting wire. In the figures, the numeral 15 indicates an elongated strip of metal foil of any kind that is useful or customary in the construction of condensers. Above the strip 15 of metal foil are two layers 16, 17 of dielectric paper or of other dielectric material. When paper is used, two layers are preferably employed, but a single layer or a larger number of layers may be used where an advantage is secured. Another strip of metal foil 18 lies upon the paper strips 16 and 17 and two additional strips of paper 19, 20 are laid upon the foil strip 18. The edge of foil strip 15 projects to the left of the paper 16, 17, 19, 20 and the edge of the foil strip 18 projects to the right of the strips of paper. It consequently follows that all portions of the metal strips are covered by paper except the projecting edges, which project from opposite sides of the finished condenser.

The preferred method of winding the condenser is to wind it on a mandrel and then remove the mandrel and insert a conductor 21 in the hole at the center of the coils, although the winding of the material directly upon the conductor 21 itself is possible. Tight fit is not essential between cable and coils. The ends of the paper strips 16, 17, 19, 20 extend beyond the ends of the metal strips 15, 18 as shown in Fig. 2 and serve as a cover and protecting sheet for the condenser. As many extra turns of paper can be made as is desirable.

When the winding of the condenser is thus completed it has the appearance, in cross section, similar to that shown in Fig. 3. The condenser as a whole is given the number 25 and from its ends project the edges of coils 15, 18 which can be used to make connection with appropriate conductors. The conductor 21 has a wire 22 of an appropriate number of strands, for instance 10 or 12, and these strands are exposed at end 23, unwound for a short distance, fanned out as shown in Fig. 2, and soldered to the coils 15. In this way all the coils may be connected, on one side of a diameter of the condenser, to each strand of the wire conductor. This connection has an inherent degree of high perfection.

The connection to the other plate of the condenser is made by means of a flexible metal strip 26 which is soldered to the projecting ends of coil 18, on one side of the diameter, as shown at 26' in Fig. 3, and is brought into contact with, and is preferably soldered or welded to, a clip 30 shown in end view in Fig. 13. The clip 30 is preferably made from a metal blank 31 which has holes 32 to provide good anchorage between clip, compound, solder, and coil, and hole 33 to serve as a mounting and ground connection for the condenser. Through the holes 32 the insulation shrinks upon the coils of the condenser. The metal blank 31 is roughened, preferably by sandblast, and is tin or cadmium plated, and is bent into the form of Fig. 13, the lop of which has a size such that it must be sprung apart a little to be slid over the condenser 25 and holds the coils thereof in position by pressure when released. The plating prevents rusting of the projecting tip of the condenser. The connecting strip 26 may go under the clip, between the clip and the outer windings of paper, but will preferably be applied to the clip externally. In either case, it is soldered or welded to the clip to make sure of a good connection.

In order to complete the condenser it is simultaneously impregnated with and encased in a plastic and when thus properly impregnated, has the final appearance shown in Figs. 4 and 5. The impregnation, if properly carried out, extends between all the windings of the condenser and all the turns of its coils, and covers the outside except for the small exposed portion 31' which serves as one of the electrical connections of the condenser. The numeral 25' is given to the plastic employed to impregnate and seal the condenser.

In order to carry out the novel process and to make the novel condenser of this invention, a new and useful mold has been constructed having spaces to hold a plurality of condensers undergoing impregnation. This mold is shown in opened-out position in Figs. 8 and 9 and in assembled position in Fig. 10. In Fig. 8 the numeral 40 indicates a metal blank, 41 an end piece for one side of the blank, and 42, 43 flanges or ledges projecting from ends of the mold part 40. In Fig. 9 is shown the complementary part of the mold consisting of a metal body 44 having an end piece 45 and end flanges 46, 47. The mold is made in a novel way: first, two metal blocks 40—44 are assembled as shown in Fig. 10 and are held together by a vise. During this portion of the operation it will be understood that no drilling has taken place either horizontally or vertically in the two rectangular portions of the mold—they are simply blanks. Now the two parts are drilled to an appropriate depth vertically, the drillings being indicated in Figs. 8, 9, and 10 by number 55, and their bottoms by number 56. Holes 57 are made in the bottoms 56. Round bar stock of size equal to drillings 55 are cut and studs 61 are seated in one end to cooperate with holes 57. The plugs 58 are then fixed in drillings 55 by pins 63. Now the mold is drilled at right angles to the plugs and eccentrically thereof, partway through the block as shown at 50. A central hole 73 is provided for the cable 21 of the condenser during filling, and a filling and gas escape hole 72 also extends to the outside of the form from the drillings 50. Holes 72—73 open into a depression 71, in one side of the form, which serves as a reservoir to hold excess sealing compound to compensate for shrinkage on drying and curing. The contour of the plugs is finished to remove any excess material.

The drillings 50 are closed by end pieces 41—45 attached by screws to the parts 40—44, respectively.

When a condenser is to be impregnated, the springs 48 are removed from the ends of the mold, the sections are separated as shown in Figs. 8 and 9 and wound condensers are placed in the recesses 50 with the projecting tabs 31' in the bottoms 56 of the drillings 55 with the holes 33 aligned with holes 57. The upper mold part is now put in place and fits snugly upon the portion 31' but not elsewhere. The pins 61 pass through holes 33, in the clips, into holes 57. Elsewhere there is a material space indicated by the number 74 in Fig. 10 which surrounds the clip 30. All of the mold recesses having been occupied by condensers, the mold parts are clipped together by clips 48, 49, the mold is evacuated, the reservoir 71 is filled with molten plastic which penetrates thoroughly through the windings and furnishes a protective coating for the clip, leaving the connection 31' bare. This is shown in Figs. 4 and 5.

In impregnating the condensers the molds are to be submerged in the impregnant with the reservoir uppermost, and the molds are placed in vacuum of 1 to 3 inches of mercury, absolute pressure, for 15 to 30 minutes in order to give the air in the remotest of the windings opportunity to be withdrawn. This pressure is maintained throughout the following steps. The molds are submerged in the impregnant, which permeates the evacuated mold and the windings of the condenser, displacing the air, which escapes through the filling openings, of which there may be more than one. The molds are preferably completely covered with the plastic compound. After a sufficient time has been allowed for the impregnation to proceed completely, the vacuum is slowly reduced to atmospheric pressure and thereafter 50 to 60 pounds of air pressure per square inch is applied to the surface of the compound in which the molds are submerged. Thereafter, the pressure is slowly reduced to atmospheric pressure again and the molds, with reservoirs 71 full, are placed in racks in an oven at elevated temperature. The temperature employed will depend upon the compound used, being different for certain rubber compounds than for plastics of styrene type, for instance. In general, a temperature of 140° F. is not unsatisfactory. Variations in the temperature result in differences in curing time. The molds are opened while still warm but the condensers are preferably not removed until they have cooled. If further treatment of the plastic is required to complete its polymerization or curing, such treatment is given. For instance, with certain styrene compounds it is necessary to bake the coils for six hours at 140° F. in order that the curing shall be complete throughout.

A useful compound for impregnation is composed of 60% styrene and 40% polyester catalyzed by lauroyl-peroxide and dyed with anthraquinone violet. It is to be understood that any dye can be used, that any other known catalyst for styrene-polyester can be used, and that the resin itself is merely illustrative of a synthetic plastic. The styrene-polyester mixture may well contain 100 parts by weight of resin, 1.5 parts by weight of lauroyl-peroxide and .05 part by weight of anthraquinone violet. The mixture should be well mixed before admission to the mold.

An advantage of the invention is a condenser of novel construction and high efficiency. Another advantage arises from the method of constructing the condenser. A further advantage springs from the method of connecting a polystrand wire to the plates of the condenser. A further advantage arises from the fact that the connection between the condenser and its leads are relieved of strain by the novel methods and structures hereinbefore described. Another advantage arises from the impregnation and casing of the condenser. Other advantages, electrical and mechanical, will be apparent to persons skilled in the arts of making and of using condensers.

As many apparently widely different embodiments of the present invention may be made without departing from the spirit and scope thereof, it is to be understood that the invention is not limited to the specific embodiments, except as defined in the appended claims.

What is claimed is:

1. The method of constructing a condenser that includes the steps of winding upon a mandrel a sandwich containing two metal strips separated by and projecting oppositely from beneath pluralities of insulating strips, resiliently embracing the wound roll with, and connecting one projecting strip of metal to, a metal clip, passing a flexible insulated wire through the roll and connecting it to the projecting turns of the other strip of metal, anchoring a laterally extending end portion of said clip between separable connected parts of a mold to support said roll and the roll encircling portion of said clip in and in spaced relation to the walls of a cavity in said mold, evacuating the mold cavity, and encasing and impregnating the roll with a unitary mass of yieldable plastic sealing and insulating compound in the evacuated mold.

2. The method of constructing a condenser that includes the steps of winding a tubular sandwich containing two metal strips separated by and projecting oppositely from beneath pluralities of insulating strips, resiliently gripping the wound roll in the loop of a metal clip, connecting the projecting turns of one strip of metal to said clip, passing a flexible insulated wire through the tube and connecting it to the projecting turns of the other strip of metal, anchoring a laterally extending end portion of said clip between connected parts of a mold to support said roll and loop in and in spaced relation to the walls of a cavity in said mold, evacuating the mold cavity, and encasing and impregnating the roll with a unitary mass of yieldable plastic sealing and insulating compound in the evacuated mold.

3. The method of constructing a condenser that includes the steps of winding two metal strips separated by insulating strips, resiliently embracing the wound roll with and connecting one of said strips of metal to a metal clip, connecting a conductor to the other of said metal strips, anchoring a laterally extending end portion of said clip between separable connected parts of a mold to support said roll and the roll encircling portion of said clip in and in spaced relation to the walls of a cavity in said mold, evacuating the mold cavity, and encasing and impregnating the roll with a unitary mass of yieldable plastic sealing and insulating compound in the evacuated mold.

References Cited in the file of this patent

UNITED STATES PATENTS

| 1,270,969 | Parker | July 2, 1918 |
| 1,307,341 | Brinton | June 24, 1919 |
| 1,830,907 | Kindl | Nov. 10, 1931 |
| 1,873,298 | Davis | Aug. 23, 1932 |
| 1,937,010 | Dubilier | Nov. 28, 1933 |
| 2,018,480 | Apple | Oct. 22, 1935 |
| 2,091,591 | Hartzell | Aug. 31, 1937 |
| 2,387,759 | Jarvis | Oct. 30, 1945 |
| 2,456,381 | Clark | Dec. 14, 1948 |
| 2,484,215 | Foster | Oct. 11, 1949 |
| 2,559,141 | Williams | July 3, 1951 |

FOREIGN PATENTS

| 587,935 | Great Britain | May 9, 1947 |
| 611,900 | Great Britain | Nov. 4, 1948 |